United States Patent
Klein et al.

(10) Patent No.: US 8,210,055 B2
(45) Date of Patent: Jul. 3, 2012

(54) STRAIN GAUGE ROSETTE FOR INTERNAL STRESS MEASUREMENT

(75) Inventors: Sebastian Klein, Munich (DE); Thomas Kleckers, Griesheim (DE)

(73) Assignee: Hottinger Baldwin Messtechnik GmbH, Darmstadt (DE)

( * ) Notice: Subject to any disclaimer, the term of this patent is extended or adjusted under 35 U.S.C. 154(b) by 33 days.

(21) Appl. No.: 12/744,189

(22) PCT Filed: Nov. 24, 2008

(86) PCT No.: PCT/EP2008/009936
§ 371 (c)(1),
(2), (4) Date: Jul. 8, 2010

(87) PCT Pub. No.: WO2009/065615
PCT Pub. Date: May 28, 2009

(65) Prior Publication Data
US 2010/0313677 A1 Dec. 16, 2010

(30) Foreign Application Priority Data
Nov. 23, 2007 (DE) .......................... 10 2007 056 443

(51) Int. Cl.
*G01D 7/00* (2006.01)
*G01L 1/22* (2006.01)
(52) U.S. Cl. .......... 73/862.044; 73/862.043; 73/862.041
(58) Field of Classification Search ........... 73/862.041–862.044
See application file for complete search history.

(56) References Cited

U.S. PATENT DOCUMENTS

| | | | | |
|---|---|---|---|---|
| 2,848,892 A * | 8/1958 | Hoffman | ................... | 73/862.628 |
| 3,915,015 A * | 10/1975 | Crane et al. | .............. | 73/862.044 |
| 3,937,058 A * | 2/1976 | Hilbrands | ..................... | 73/11.08 |
| 3,943,758 A | 3/1976 | Wolf et al. | | |
| 4,836,034 A * | 6/1989 | Izumi et al. | .............. | 73/862.044 |
| 5,117,687 A * | 6/1992 | Gerardi | ............................ | 73/180 |
| 5,317,921 A * | 6/1994 | Kremidas | ........................ | 73/727 |
| 2006/0064264 A1 * | 3/2006 | Pottebaum et al. | ............. | 73/1.13 |

FOREIGN PATENT DOCUMENTS

| | | |
|---|---|---|
| DE | 23 45 309 | 4/1975 |
| DE | 25 58 768 | 7/1977 |
| DE | 269 908 | 7/1989 |
| GB | 1 351 859 | 5/1974 |

OTHER PUBLICATIONS

A. Owens, "In-Situ Stress Determination Used in Structural Assessment of Concrete Structures", 2234 Strain vol. 29, No. 4, pp. 115 to 123, Nov. 1993, New Castle GB.
S. Keil, "On-line Evaluation of Measurement Results During the Determination of Residual Stress Using Strain Gages", Reports in Applied Measurement RAM vol. 9, No. 1, pp. 15 to 20, Jan. 1995, Hottinger Baldwin Messtechnik GmbH, Darmstadt Germany.

(Continued)

*Primary Examiner* — Lisa Caputo
*Assistant Examiner* — Jonathan Dunlap
(74) *Attorney, Agent, or Firm* — W. F. Fasse

(57) ABSTRACT

A strain gage rosette for internal stress measurement on workpieces according to the bore hole method has at least three pairs of diametrically opposed measuring grids all at an equal radial spacing and in different directions radially about a centering mark. The two measuring grids of each diametrically opposed pair are circuit-connected or coupled with one another such that the measurement signals thereof are averaged.

20 Claims, 1 Drawing Sheet

OTHER PUBLICATIONS

International Search Report of the International Searching Authority for International Application PCT/EP2008/009936, mailed Mar. 20, 2009, 3 pages, European Patent Office, HV Rijswijk, Netherlands.

Written Opinion of the International Searching Authority (English Translation) for International Application PCT/EP2008/009936, mailed Mar. 20, 2009, 5 pages, European Patent Office, HV Rijswijk, Netherlands.

K. Hoffmann, "An Introduction to Measurements Using Strain Gages", Section 8.3 "Determination of Residual Stresses According to the Drill-Hole Method", pp. 231-233, 1989, Hottinger Baldwin Messtechnik GmbH, Darmstadt Germany.

* cited by examiner

STRAIN GAUGE ROSETTE FOR INTERNAL STRESS MEASUREMENT

FIELD OF THE INVENTION

The invention relates to a strain gage rosette for internal stress measurement on workpieces according to the bore hole method.

BACKGROUND INFORMATION

For certain workpieces or structural components it is often necessary to determine if internal stresses are present therein, and what magnitude and direction these comprise. In that regard, the term internal stresses means stresses in a structural component that are effective without external mechanical loading and that are subject to a spatially homogeneous and temporally constant temperature field.

For measuring such internal stresses, there are various different testing methods with which the internal stress condition on the surface and in the interior of the material can be determined. In the range near the surface up to a depth of several millimeters, the bore hole method is often utilized. Thereby, a hole is bored at a certain location of the structural component at which the internal stresses are to be determined, wherein the diameter and the bore depth of the hole is based on the test sample thickness. Through this bore hole, a portion of the internal stresses present in the material is released, whereby measurable deformations arise in the vicinity of the bore hole rim.

By measuring these deformations in the region of the bore hole, a conclusion can then be reached about the effective internal stresses. For that, the strains in three different directions must be determined, for example by applying three strain gages that are grouped around the bore hole. In this method, however, only relatively small strain gages can be used, because the substantial analogy between the differential strain and the triggered internal stress portions exists only in the direct vicinity of the bore hole.

Such a method and a strain gage rosette used therefor is known from the DE-OS 25 58 768. Therein, the strain gage rosette consists of a carrier film on which three measuring grids are arranged at the angular positions of 0°, 45° and 90° around a central middle point or center point. In the internal stress measurement according to the bore hole method, the difficulty is that the workpiece is to be bored exactly in the middle of the glued-on rosette. Namely, with a bore hole that is not centrally applied, the strain measuring grids, which are then arranged at different radial distance, detect a spacing distance dependent strain, which then lead to measurement errors. Therefore, the strain gage rosette is glued-on with its center point exactly centered on a circuit board, whereby a centering bushing is soldered-on in the center of the circuit board. In that regard, a central bore hole is provided in the centering bushing, and a centering pin is inserted in the central bore hole. The strain gage rosette is then glued onto the workpiece to be tested.

For the exact introduction of the bore hole, then a special drilling or boring apparatus of a U-shaped metal bail with a drill or borer guide is arranged over the strain gage rosette, and is applied or set-on exactly centered to the strain gage rosette by a centering pin that is inserted in the centering bushing. Then, after the centering, the centering pin is removed out of the drilling or boring apparatus, and the shaft of a drilling or boring machine is inserted into the drilling or boring apparatus, in order to introduce into the workpiece a very exact central bore hole between the glued-on measuring grids. The strains that are thereby triggered during the drilling or boring process are then converted into electrical signals by the is strain gage grids, and then the internal stresses are calculable from the electrical signals. Because a substantial analogy between the differential strain and the triggered internal stress portions exists only in the direct vicinity of the bore hole, the strain gages grouped around the bore hole must be relatively small. Therefore such strain gage rosettes often have only diameters of approximately 10 to 15 mm, so that already small eccentricities can cause relatively large measuring errors. Therefore, the required maximum acceptable eccentricities of 0.02 mm often cannot be realized even with the above described very complicated boring apparatus.

SUMMARY OF THE INVENTION

Therefore, it is the underlying object of the invention to improve a measuring method and a strain gage rosette used therefor, for the internal stress measurement of workpieces according to the bore hole method in such a manner so that therewith very high measuring accuracies are achievable and this is realizable with the smallest possible measurement technology cost or effort.

The above object has been achieved according to a first aspect of the invention in a film-backed strain gage rosette arrangement for measuring stress in a workpiece, whereby the rosette arrangement is to be mounted on the workpiece. The arrangement comprises a carrier film adapted to be adhesively bonded on the workpiece, a centering mark, at least three pairs and preferably exactly eight strain gage measuring grids arranged on the carrier film respectively at the same radial spacing distance from the centering mark, whereby the measuring grids are arranged as grid pairs of diametrically opposite grids about the centering mark. There is further a circuit arrangement which couples the measuring grids of each grid pair with one another so as to produce an average output of each grid pair in a pairwise manner.

The above object has been achieved according to another aspect of the invention in a film-backed strain gage rosette arrangement comprising a carrier film, a centering mark, at least six strain gage measuring grids arranged as at least three diametrically opposite grid pairs, all at the same radial spacing distance from the centering mark on the carrier film, and two conductor leads respectively connected to each measuring grid without crossing over one another and terminating at respective connection points. There is further a circuit foil with conductor paths connected to the connection points so as to connect the two measuring grids of each grid pair in series or in parallel. Thereby, the total number of the connection points is twice the total number of the measuring grids, and the total number of the measurement output points of the conductor paths is equal to the total number of the measuring grids.

Still further, the above object has been achieved according to yet another aspect of the invention in a measuring arrangement for measuring internal stress in a workpiece by a bore hole stress relief technique, comprising a strain gage rosette arrangement and a circuit arrangement. The rosette arrangement comprises a carrier film, a centering mark, at least six strain gage measuring grids arranged on the rosette carrier film as at least three grid pairs of diametrically opposed measuring grids, which are all arranged at the same radial distance about the centering mark, and respectively two grid conductors connected to each one of the measuring grids and terminating at two grid connection points. The grid conductors do not cross over one another. The circuit arrangement comprises output conductors connected to the connection points and to plural measurement points, and interconnect conductors that connect the two measuring grids of each grid pair to one another in parallel or in series, adapted so that the electrical signal output at each respective pair of the measurement points is an average of the electrical signals produced by the two measuring grids of the respective associated grid pair.

The invention has the advantage that the measuring errors due to small eccentricities can largely be compensated through the radially oppositely arranged measuring grids of a common measuring direction. For that, simply the measuring signals of the oppositely lying measuring grid pairs must be determined, whereby the measuring error due to the eccentricity of the bore hole can advantageously be improved by a factor of up to 20.

The invention further has the advantage that in such a rosette with two oppositely lying measuring grids of a measuring direction, the average value thereof can be achieved with the aid of a simple series or parallel circuit or simple arithmetic means, so that no significant measurement technological or equipment expenditure or effort is necessary for this.

The invention additionally has the advantage that simply through a doubling of the measuring grids on an otherwise similar strain gage rosette, the measuring accuracy can be improved by a multiple in a simple manner, without needing to have increased the effort or expense for the central introduction of the bore hole. In that regard, the additional effort or expense for doubling the measuring grids on an otherwise similar rosette arrangement is relatively small, because the measuring grids are completely automatically produced through a common etching process on an otherwise similar carrier film or foil. Therefore, with such strain gage rosettes produced in an economical manner an increase of the measuring accuracy is advantageously to be achieved, even though the effort or expense of the centering accuracy can be reduced.

BRIEF DESCRIPTION OF THE DRAWINGS

The invention is explained more closely in connection with example embodiments, which are illustrated in the drawings. It is shown by.

DETAILED DESCRIPTION OF EXAMPLE EMBODIMENTS OF THE INVENTION

Figure 1:
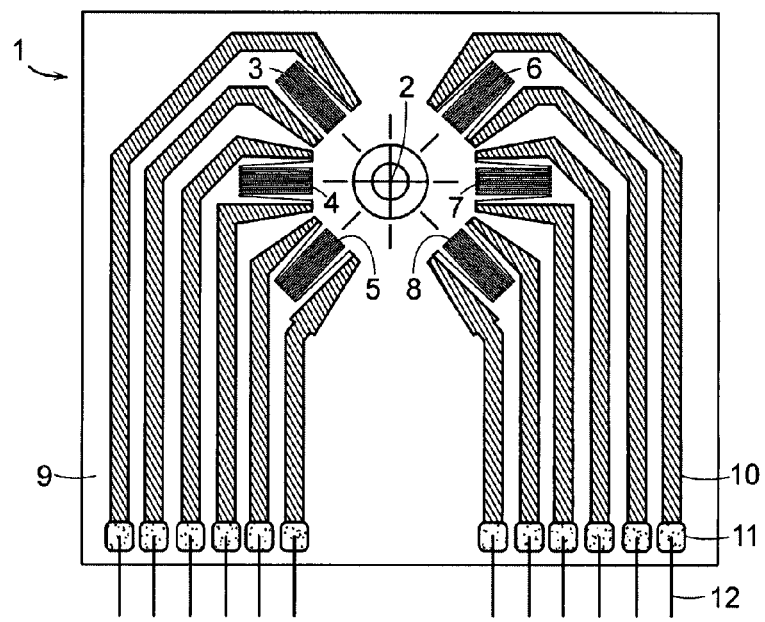
FIG. 1 a six measuring grid bore hole rosette.

FIG. 1 of the drawing shows a strain gage rosette 1 as a bore hole rosette, in which three similar or same-type measuring grids 3, 4, 5 are arranged at an angular spacing of 45° at a uniform radial spacing about a bore hole centering 2, and an allocated similar or same-type measuring grid 6, 7, 8 lies respectively opposite the measuring grids 3, 4, 5 symmetrically to the bore hole centering 2.

In that regard, the strain gage rosette 1 consists of a plastic carrier layer 9 on which six conventional meander-shaped measuring grids 3, 4, 5, 6, 7, 8 are applied. All measuring grids 3, 4, 5, 6, 7, 8 are thereby arranged concentrically about a central bore hole marking 2. Thereby the three left- 3, 4, 5, or right-side 6, 7, 8 measuring grids are provided like typical three grid bore hole rosettes about a bore hole marking 2, whereby all measuring grids 3, 4, 5, 6, 7, 8 comprise a common radial spacing to the bore hole marking 2. The three left-side measuring grids 3, 4, 5 are thereby oriented in three different directions between 0 to 90°. Between the measuring grids 3, 4, 5, a common angle of 45° is provided, so that the three left-side measuring grids 3, 4, 5 cover an angular range of 90°.

Internal stresses in workpieces or structural components can arise through internal or external forces that act on the workpiece. The form changes caused by the forces are characterized by longitudinal and crosswise displacements. The three tensions or stresses referenced to the unit area correspond to the internal forces in the workpiece. The stress conditions can be characterized on one, two or three axes, whereby the deformation conditions are always characterized on three axes. Therefore it is necessary, as long as the main strain directions are not known, to provide three measuring grids 3, 4, 5 oriented in different directions, in order to detect the deformation conditions. Because a conclusion of the internal stress can be determined computationally from the detected strain changes, basically the respective orientation of the measuring grids 3, 4, 5 is insignificant or unimportant, so that arrangements of 0°, 90° and 135°, or 0°, 60° and 120° also occur. Nonetheless, however, the three measuring grids 3, 4, 5 must always be oriented in different direction, so that an angular offset of 180° between two measuring grids 3, 4, 5 of a rosette was previously not known in bore hole rosettes.

For the special case, that for example the internal stress in one is of the main stress directions is known, then the internal stress measurement could, as an exception, also be detected with only two measuring grids oriented in deviating directions about a bore hole. This is not relevant practically, however, so that previous bore hole rosettes comprise at least three measuring grids, of which the angular spacings are always <180°. Therefore, with the illustrated six measuring grid bore hole rosette 1, the strains are detected in the three main strain directions of 0°, of 45° and 90°. This is achieved similarly by the three left-side measuring grids 3, 4, 5 as well as by the three right-side measuring grids 6, 7, 8, which lie opposite one another in a mirror symmetrical manner, and thus comprise a same spacing distance to the bore hole center point and the allocated opposite-lying measuring grids. Because all six measuring grids 3, 4, 5, 6, 7, 8 are embodied similarly, the measuring grid pairs 3, 8; 4, 7; 5, 6 respectively lying 180° opposite one another would basically have to detect the same strain during the boring process, because they are oriented in the same main strain direction.

The invention now uses this fact in order to correct unavoidable bore hole tolerances and therewith measuring inaccuracies due to an eccentric bore hole arrangement. Namely, with the presently demanded measuring accuracies, partially only maximum permissible eccentricities of 0.02 mm are tolerable, which are achievable with conventional bore hole centering methods only with great measurement technological effort and expense. Due to the influence on the internal stresses to be detected, mechanical bore hole centerings, such as center punching and the like, are not permitted, so that in practice generally only eccentricities of >0.02 mm are achievable.

Therefore the invention suggests to provide two similar or same-type measuring grids 3, 8; 4, 7; 5, 6 lying 180° opposite one another on a strain gage rosette for at least each main strain direction to be detected, whereby the deviation of the measuring grids due to the eccentricity of the bore hole is substantially compensatable by an average value formation. For that it is then necessary, however, to average the detected strain measurement values of a main strain direction in order to minimize the error caused thereby. This is, however, not completely successful, because the calculable internal stresses do not run proportional to the spacing distance of the bore hole, so that a residual error remains. However, practical tests have resulted in an improvement of the measuring accuracy by the factor 20, for a highest possible eccentricity accuracy of, for example 0.02 mm. With a reduction of the effort or expense, with a simple bore hole centering method, eccentricities of for example 0.1 mm were still achievable, which still resulted in an improvement of the measuring accuracy by the factor 8 with the inventive bore hole rosette 1, compared to the highest possible maximum permissible eccentricity of a simple bore hole rosette with only three comparable measuring grids.

Figure 2:
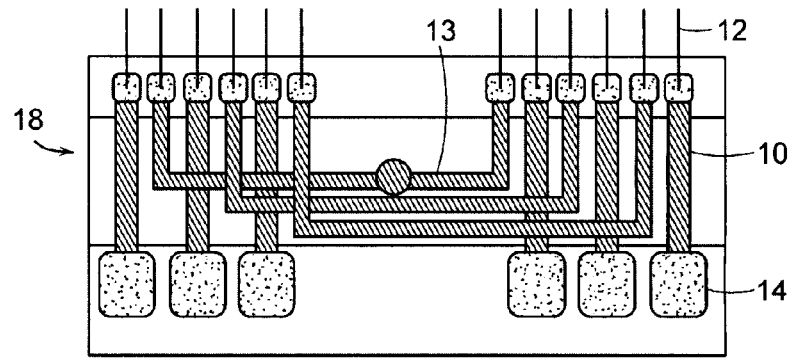
FIG. 2 a circuit foil for a six measuring grid bore hole rosette.

The invention proposes three different methods for the corresponding average value formation of the two measuring grid pairs 3, 8; 4, 7; 5, 6 that are arranged lying 180° opposite one another. Preferably the average value formation can be achieved by a series circuit connection of the respective opposite-lying and allocated two measuring grids 3, 8; 4, 7; 5, 6. Such a separate circuit foil 18 is shown in FIG. 2 of the drawing. In that regard, the circuit foil 18 is connected via copper wires 12, for example, respectively with the connection conductor paths 10 of the strain gage rosette guided out to the connection points 11. Thereby the circuit foil 18 already includes hard-wired conductor path bridges 13, through which the measuring grid pairs 3, 8; 4, 7; 5, 6 of a main strain direction, which are arranged lying 180° opposite one another, are circuit-connected in series. Then on the output side, only six measurement conductor points 14 are still present, like in a conventional bore hole rosette with three measuring grids.

However, the six measuring grids 3, 4, 5, 6, 7, 8 can also be circuit-connected in series in a conventional manner by means of the twelve connection points 11 of the six measuring grid bore hole rosette 1, in order to obtain the average value of a strain direction respectively as output signals.

Such a fixed circuit-connection could, however, be provided directly on the carrier film 9 of the bore hole rosette 1. Because the conductor paths 10 would, however, cross one another thereby, this is only possible through a bore hole rosette 1 with a stacked construction.

An average value formation could, however, also be achieved through a parallel circuit of the allocated measuring grid pairs 3, 8; 4, 7; 5, 6 of a strain direction, which are arranged lying 180° opposite one another. Because the measurement signals of each measuring grid 3, 4, 5, 6, 7, 8 are often still supplied to an analog-digital converter after the amplification, this could also be carried out subsequently in a computational manner by means of a simple computer circuit. Then for that purpose, in connection with larger eccentricities, correction factors could still be provided, which compensate the non-linearity to the bore hole deviation.

Figure 3:
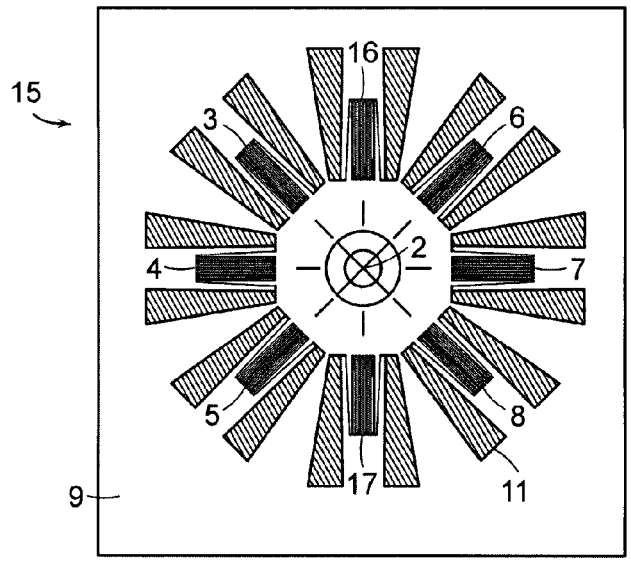
FIG. 3 an eight measuring grid bore hole rosette.

A further embodiment of a strain gage rosette is shown in FIG. 3 of the drawing as an eight measuring grid bore hole rosette 15. This differs from the six measuring grid bore hole rosette 1 simply by a further pair of similar or same-type measuring grids 16, 17, with which an additional strain direction of a material can be detected. In that regard, the additional measuring grid pair 16, 17 is arranged in an angular spacing of 45° to the neighboring measuring grid pairs. Thereby an improvement of the accuracy is preferably achieved in connection with an eccentricity that would have extended in the grid-free direction in a six measuring grid bore hole rosette 1. Furthermore, the measuring accuracy is already increased due to the increase of the evaluatable measurement signals, especially if the main strain direction extends in the direction that was previously not provided with a measuring grid. Moreover, bore hole rosettes with further measuring grid pairs can still also be embodied, in so far as the space conditions on the carrier layer 9 allow this for the measuring grids arranged close to the bore hole. Namely, in the above described example embodiment, the two bore hole rosettes 1, 15 have only a diameter or an edge length of preferably 12 mm. Therefore, an increase of the number of measuring grids over eight is preferably only presented for larger bore hole diameters. Namely, in the bore hole method, the bore hole diameter and its bore hole depth is primarily determined according to the analysis depth, so that not always only small bore hole diameters are sufficient.

The invention claimed is:

1. A film-backed strain gage rosette arrangement for stress measurement on a workpiece, whereby said film-backed strain gage rosette arrangement is to be mounted on a strainable element of the workpiece, said film-backed strain gage rosette arrangement comprising:
a common carrier film arrangement, comprising a carrier film, wherein said common carrier film arrangement is adapted to be adhesively bonded onto the strainable element of the workpiece;
a centering mark provided on said carrier film arrangement;
a total of exactly eight strain gage measuring grids arranged on said common carrier film arrangement respectively at equal radial spacing distances from said centering mark on eight radial lines extending radially outwardly from said centering mark, wherein said radial lines are successively spaced radially from one another by 45° about said centering mark, and wherein said eight strain gage measuring grids form four opposite pairs of respectively two of said measuring grids that respectively lie 180° opposite one another about said centering mark; and
a circuit arrangement by which said two measuring grids of each one of said opposite pairs respectively are circuit-connected or coupled with one another such that respective output values of said two measuring grids of each said opposite pair will be averaged with one another in a pairwise manner.

2. The strain gage rosette arrangement according to claim 1, wherein said circuit arrangement includes two connection points respectively at terminal ends of two conductor leads connected to each respective one of said measuring grids, for a total of sixteen of said connection points on sixteen of said conductor leads.

3. The strain gage rosette arrangement according to claim 2, wherein said conductor leads are arranged on said carrier film arrangement, and said connection points are all arranged along a longitudinal side of said carrier film arrangement.

4. The strain gage rosette arrangement according to claim 2, wherein said circuit arrangement further includes connection conductor paths which connect together in series or in parallel said connection points that are respectively connected to said two respective measuring grids of each one of said opposite pairs of said measuring grids.

5. The strain gage rosette arrangement according to claim 4, wherein said connection conductor paths are arranged on said common carrier film arrangement.

6. The strain gage rosette arrangement according to claim 4, further comprising a separate carrier film that is separate from said common carrier film arrangement, wherein said connection conductor paths are arranged on said separate carrier film.

7. The strain gage rosette arrangement according to claim 1, wherein said circuit arrangement respectively connects together in series with one another said two measuring grids of each respective one of said opposite pairs of said measuring grids.

8. The strain gage rosette arrangement according to claim 1, wherein said circuit arrangement respectively connects together in parallel with one another said two measuring grids of each respective one of said opposite pairs of said measuring grids.

9. The strain gage rosette arrangement according to claim 1, wherein said circuit arrangement comprises conductor path bridges that are stacked and cross one another.

10. The strain gage rosette arrangement according to claim 1, wherein said circuit arrangement includes a total of eight external connection points, wherein respective pairs of said external connection points connect to said respective opposite pairs of said measuring grids.

11. A film-backed strain gage rosette arrangement for stress measurement on a workpiece, whereby said film-backed strain gage rosette arrangement is to be mounted on a strainable element of the workpiece, said film-backed strain gage rosette arrangement comprising:
a common carrier film arrangement, comprising a carrier film, wherein said common carrier film arrangement is adapted to be adhesively bonded onto the strainable element of the workpiece;
a centering mark provided on said carrier film arrangement;
at least six strain gage measuring grids arranged on said common carrier film arrangement respectively at equal radial spacing distances from said centering mark on at least six radial lines extending radially outwardly from said centering mark, wherein said radial lines are successively spaced radially from one another about said centering mark, opposite pairs of said radial lines are arranged 180° opposite one another about said centering mark, and opposite pairs of respectively two of said measuring grids respectively lie on said opposite pairs of said radial lines 180° opposite one another about said centering mark;
two conductor leads respectively for each one of said measuring grids, wherein said conductor leads are all arranged on said common carrier film arrangement and extend along said common carrier film arrangement without any of said conductor leads crossing over any other one of said conductor leads, and wherein said conductor leads respectively terminate at respective connection points, such that a total number of said connection points is twice a total number of said measuring grids; and
a circuit foil that includes conductor paths which are connected to said connection points of said conductor leads so as to respectively connect together in series or in parallel said two respective measuring grids of each respective one of said opposite pairs of said measuring grids, wherein said conductor paths of said circuit foil respectively terminate at respective measurement output points, such that a total number of said measurement output points is equal to a total number of said measuring grids.

12. The strain gage rosette arrangement according to claim 11, wherein said total number of said measuring grids is exactly eight.

13. The strain gage rosette arrangement according to claim 11, wherein said circuit foil is separate from said common carrier foil arrangement.

14. The strain gage rosette arrangement according to claim 11, wherein said circuit foil includes conductor path bridges that cross over one another.

15. A measuring arrangement for measuring internal stress in a workpiece by a bore hole stress relief technique, comprising a strain gage rosette arrangement and a circuit arrangement,
wherein said rosette arrangement comprises:
a rosette carrier film to be adhesively bonded onto the workpiece of which the internal stress is to be measured,
a centering mark provided on said rosette carrier film for centering with respect to a bore hole to be bored into the workpiece,
at least six strain gage measuring grids arranged on said rosette carrier film as at least three grid pairs of said measuring grids diametrically opposed from one another about said centering mark respectively along at least three different radial directions, wherein all of said measuring grids are arranged at the same common radial distance relative to said centering mark, and
respectively two grid conductors connected to each one of said measuring grids and respectively terminating at two grid connection points on said rosette carrier film, wherein a total number of said grid conductors equals a total number of said grid connection points and equals twice a total number of said measuring grids, wherein none of said grid conductors cross over one another; and
wherein said circuit arrangement comprises:
plural measurement points at which electrical signals of said measuring grids are output, wherein a total number of said measurement points equals one-half of said total number of said grid connection points and equals said total number of said measuring grids,
plural output conductors connected respectively to said plural measurement points and respectively to said grid connection points of said grid pairs of said measuring grids, wherein a total number of said output conductors equals said total number of said measurement points, and
plural interconnect conductors that are connected to said grid connection points so as to connect the two measuring grids of each said grid pair to one another in parallel or in series, adapted so that a respective electrical signal output at each respective pair of said measurement points is an average of electrical signals produced by the two measuring grids of each said grid pair respectively.

16. The measuring arrangement according to claim 15, wherein said interconnect conductors cross over one another and/or cross over one or more of said output conductors.

17. The measuring arrangement according to claim 15, wherein said circuit arrangement is provided on said rosette carrier film.

18. The measuring arrangement according to claim 15, wherein said circuit arrangement further comprises:
a circuit carrier separate from said rosette carrier film, wherein said measurement points, said output conductors and said interconnect conductors are arranged on said circuit carrier, and
respective wires connecting said grid connection points on said rosette carrier film with said output conductors and said interconnect conductors on said circuit carrier.

19. The measuring arrangement according to claim 15, wherein said interconnect conductors connect the two measuring grids of each said grid pair to one another in parallel.

20. The measuring arrangement according to claim 15, wherein said interconnect conductors connect the two measuring grids of each said grid pair to one another in series.

* * * * *